United States Patent [19]
Kelley et al.

[11] Patent Number: 5,902,854
[45] Date of Patent: *May 11, 1999

[54] POLYDIMETHYLSILOXANE CONTAINING POLYMER BLENDS

[75] Inventors: David C. Kelley, Angleton; Jose V. Saavedra; Laura B. Weaver, both of Lake Jackson; John O. Bieser, Houston, all of Tex.

[73] Assignee: The Dow Chemical Company, Midland, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/720,405

[22] Filed: Sep. 27, 1996

[51] Int. Cl.$^6$ ............................................. C08F 8/00
[52] U.S. Cl. ..................... 525/101; 525/100; 525/103; 525/106; 523/150; 8/115.6; 36/25 R; 524/269; 524/427
[58] Field of Search ................... 525/100, 101, 525/103, 106; 523/150; 8/115.6; 36/25 R; 524/269, 427

[56] References Cited

U.S. PATENT DOCUMENTS

| | | | |
|---|---|---|---|
| 3,645,992 | 2/1972 | Elston | 260/80.78 |
| 4,076,698 | 2/1978 | Anderson et al. | 526/348.6 |
| 4,535,113 | 8/1985 | Foster et al. | 524/262 |
| 4,684,576 | 8/1987 | Tabor et al. | 428/441 |
| 4,692,386 | 9/1987 | Schinkel et al. | 428/515 |
| 4,798,081 | 1/1989 | Hazlitt et al. | 73/53 |
| 5,008,204 | 4/1991 | Stehling | 436/85 |
| 5,026,798 | 6/1991 | Canich | 526/127 |
| 5,055,438 | 10/1991 | Canich | 502/117 |
| 5,064,802 | 11/1991 | Stevens et al. | 502/155 |
| 5,272,236 | 12/1993 | Lai et al. | 526/348.5 |
| 5,276,116 | 1/1994 | Gessell et al. | 526/128 |
| 5,278,204 | 1/1994 | Tojo et al. | 523/212 |
| 5,278,272 | 1/1994 | Lai et al. | 526/348.5 |

FOREIGN PATENT DOCUMENTS

| | | | |
|---|---|---|---|
| 0 416 815 A2 | 8/1990 | European Pat. Off. | C08F 10/00 |
| 0 604 750 A1 | 11/1993 | European Pat. Off. | B29C 43/18 |
| 0 600 166 A1 | 6/1994 | European Pat. Off. | C08L 23/04 |

OTHER PUBLICATIONS

J. Piau and E. N. Kissi, "Measurement and Modelling of Friction in Polymer Melts During Macroscopic Slip at the Wall", *Journal of Non–Newtonian Fluid Mechanics*, vol. 54, Aug. 1994, pp. 121–142.

W. Michaeli and K. Telgenbuscher, "Scratch Resistant Anti–Condensation Layer on Polymethyl Methacrylate Made by Plasma Polymerization", *Antec '93 Conference Proceedings*, New Orleans, La., 9$^{th}$–13$^{th}$, May 1993, vol. III, pp. 2857–2863.

W. Heilen, "Activity and Evaluation of Additives to Improve the Scratch–Resistance of Coating Surfaces", *Pigment and Resin Technology*. 22, No. 4, Jul./Aug. 1993, pp. 10–15.

H. Iwata and S. Isozaki, "Surface Graft Polymerization Onto Silicone", *Journal of Applied Polymer Science*, vol. 49, No. 6, Aug. 10$^{th}$ ,1993, pp. 1041–1046.

J.J. Lannutti et al., "Fluorocarbon/Hydrocarbon Interactions and Frictional Surface Forces", *Colloids & Surfaces 71*, No. 2, May 24$^{th}$, 1993, pp. 155–166.

"Yarn Coating Technique", *High Performance Textiles*, Oct. 1992, pp. 4–5.

"New Kaolin Anti–Block", *Plastics Technology 38*, No. 7, Jul. 1992, p. 84.

P. Silberzan and L. Leger, "Spreading of High Molecular Weight Polymer (PDMS) Melts on High–Energy Surfaces (SILICA)", *Macromolecules 25*, No. 4, Feb. 17$^{th}$, 1992, pp. 1267–1271.

J. W. White et al., "New Silicone Modifiers For Improved Physical Properties and Processing of Thermoplastics and Thermoset Resins", *Antec '91 Conference Proceedings*, Montreal, May 5$^{th}$–9$^{th}$, 1991, pp. 1904–1906.

H.H. Chen, "Scratch Resistant Low Friction/Low Surface Energy Coating For Silicon Substrate", *Journal of Applied Polymer Science 37*, No. 2, Jan. 10$^{th}$, 1989, pp. 349–364.

M. Bohdanecky et al., "Analysis of Hydrodynamic Data on Linear PDMS Under THETA Conditions In Terms of The Bead–Chain and Continuous Worm–Like Cylinder Models", *Makromol. Chem. 189*, No. 9, Aug. 1988, p. 1877.

"Toughening Ropes In The Wet", *High Performance Textiles 8*, No. 8, Feb. 1988, pp. 3–4.

J. Horska et al., "Hydrodynamic Properties of Linear Polydimethyl Siloxanes In Bromocyclohexane at the Theta Temperature", *Polymer 28*, No. 7, Jun. 1987, pp. 1207–1211.

H.K. Yasuda, "Modification of Polymer Surfaces by Plasma Treatment and Plasma Polymerization", *Polymer Wear and its Control; Symposium at the 187$^{th}$ ACS Meeting*, St. Louis, Mo., Apr. 8–13, 1984, pp. 135–138. ACS Symposium. Series 287.

H.L. Vincent et al., "Polysiloxane–Silica Hybrid Resins as Abrasion–Resistant Coatings for Plastic Substrates", *Polymer Wear and its Control; Symposium at the 187$^{th}$ ACS Meeting*, St. Louis, Mo. Apr. 8–13, 1984, pp. 129–134. ACS Symposium. Series 287.9522.

J.M. Adduci, "Polyimide Blends", *Polyimides: Synthesis, Characterisation and Applications. vol. 2*; Proceedings of the First Technical Conference on Polyimides, Ellenville, NY, Nov. 10–12, 1982, pp. 1023–1052.

D.L. Powers et al., "Cartilagenous Graft As An Adjunct to Finer Joint Implant Arthroplasty", Journal of Biomedical Materials Research 19, No. 5, May/Jun. 1985, pp. 509–518.

N.S. Eiss, "Fatigue Wear of Polymers", *ACS Polymeric Mat. Sci. & Engng. 50*, Apr. 1984, pp. 78–82.

H. G. Willert et al., "Influences of Special Features of Polymer Wear Particles on the Reacting Tissues Near Total Joint Replacements", *Biomedical Polymers; International Conference; Contact Lenses & Artificial Eyes*; International Symposium, Jul. 12–15, 1982, pp. 245–251.

(List continued on next page.)

Primary Examiner—Margaret W. Glass

[57] ABSTRACT

This invention relates to compositions comprising ethylene interplymers, such as a linear or substantially linear ethylene interpolymer and polydimethylsiloxane. The compositions have good abrasion resistance without sacrificing coefficient of friction.

22 Claims, No Drawings

OTHER PUBLICATIONS

P.M. Triolo and J.D. Andrade, "Surface Modification and Evaluation of Some Commonly Used Catheter Materials. I. Surface Properties", *Journal of Biomedical Materials Research* 17, No. 1, Jan. 1983, pp. 129–147.

G.D. Patterson, "Light Scattering From Concentrated Polymer Solutions and Gels", *Polym. Preprints* 22, No. 1, Mar. 1981, pp. 74–75.

C.J.C. Edwards et al., "Studies of Cyclic and Linear Polydimethyl Siloxanes: V. Diffusion Behaviour in Dilute Solution", *Polymer 21*, No. 7, Jul. 1980, pp. 781–786.

M.J. Owen and J. Thompson, "Siloxane Modification of Polyamides", Polymer Journal, 1972, pp. 297–303.

D.G. F. Van der Sanden and Richard W. Halle, "A new family of linear ethylene polymers provides enhanced sealing performance", Exxon Chemical, Feb. 1992, Tappi Journal.

J.C. Randall, "A Review of High Resolution Liquid $^{13}$Carbon Nuclear Magnetic Resonance Characterizations of Ethylene–Based Polymers", *Review of Macromolecular Chemistry and Physics*, C29 (2&3), pp. 201–317.

Abstract No. 121:135998 HCA, "Filler–induced softening effect in thermally aged polydimethylsiloxane elastomers", pp. 3206–3211, (1994), Polymer.

Abstract No. 118:126546 HCA, "Surface properties of hydrophilic silicone–grafted copolymers", pp. 41–47, (1993), Kobunshi Ronbunshu.

Abstract No. 104:20769 HCA, "Polysiloxane–silica hybrid resins as abrasion–resistant coatings for plastic substrates", pp. 129–134, (1985), ACS Symposium Series.

Abstract No. 101:39883 HCA, "Polysiloxane/silica hybrid resins as abrasion resistant coatings for plastic substrates", pp. 143–146, (1984), Polymer Materials Science & Engineering.

Abstract No. R:461820, "Silicones for Bulk Resins", pp. 111/3, (1992), Macplas 17, No. 139.

Abstract No. R:442239, "Engineering Polymers for Conductors and Cables", pp. 83–84, (1991), Macplas 16.

Abstract No. R:341939, "Yarsley Scratch Coatings Toughen Acrylic Sheet", p. 8, (1987), Plastics Rubber Weekly.

Abstract No. R:339052, "New Lacquer Systems for Surface Modification of Organic Glass", p. 23, (1987), Plastic News.

Abstract No. R:328119, "Fatigue Wear of Polymers", pp. 59–66, (1984), Polymer Wear and its Control; Symposium at the $187^{th}$ ACS Meeting, St. Louis, Mo., 8–13.

Abstract No. 112:140160, "A Comparative Study of Individual and Collective Rotational Mition in Mixtures of Liquid Crystalline Side Group Polymers and Low–Molecular Weight Mesogens", pp. 2008–2016, (1990), Macromolecules.

Abstract No. 92:23047, "*Friction* of Polymer *Melts* at the *Wall* of *Capillaries*", pp. 1–10, (1979), Angew. Makromol. Chem.

Abstract No. R:324369, "Product Information for Dow Corning HV–490 Emulsion for Auto and Home Care Products", Data Sheet No. 22–1159–01, (1986), Brussels.

Abstract No. R:324366, "Product Information for Dow Corning 36 and 346 Emulsions for Auto and Home Care Products", Data Sheet No. 22–1149–01, (1986), Brussels.

Abstract No. R:313678, "Treatment of Organic Glass: Lacquer System for Surface Modification", p. 22, (1986), Kunst. Plast. 33, No. 1.

Abstract No. R:280907, "Product Information: Dow Corning IIII Emulsion Finishing Systems", p. 2, (1985), Brussels.

Abstract No. R:78120, "Urethane Elastomers Having Improved Physical Properties Equivalent ot DT 2620598, BE 181176", (1979), PR.19.5.75 (578562).

Abstract No. R:77435, "Polyurethane Dispersions Modified with Siloxanes Equivalent to BE 837517", (1978), PR.8.8.75 (602933).

Abstract No. R:262995, "Developments in Rubber Modified Epoxy Resins", pp. 79–80, (1984), Rev. Plast. Mod.

Abstract No. R:280847, "Product Information for Dow Corning 346 Emulsion. Release, Lubrication and Polishing Agent", Data Sheet: 22–579A–01, (1985), Brussels.

Abstract No. R:21502, "Properties of Radiation—Vulcanised Cable Rubbers Based on Siloxane Rubbers", Kauch. I Rezina No. 6, 1971, pp. 19–21.

Abstract No. R:324368, "Product Information for Dow Corning 347 Emulsion for Auto and Home Care Products", Brussels, 1986, pp. 1 12 ins. Nov. 11, 1986, Data Sheet No. 22–1150–01.

POLYDIMETHYLSILOXANE CONTAINING POLYMER BLENDS

BACKGROUND OF THE INVENTION

This invention relates to polymer compositions. In particular, this invention relates to soft, flexible polymer compositions with improved abrasion resistance. One aspect of this invention relates to polymer compositions containing linear or substantially linear α-olefin polymers and high molecular weight polydimethylsiloxane. Another aspect of this invention relates to polymer compositions containing linear or substantially linear α-olefin polymers in which the addition of polydimethylsiloxane does not substantially affect the coefficient of friction of the polymer composition nor the adhesion or heat seal strength of the composition. In yet another aspect, this invention relates to articles made from the above-mentioned polymer compositions.

Applications such as tarps, shoe soles, wire and cable insulation and jacketing where surface abrasion may occur require flexible polymers with good surface abrasion resistance. Low density (density <0.9 g/cm$^3$) ethylene/alpha olefin copolymers have good flexibility and toughness and thus are candidates for these applications; however, the low density polymers lack the surface abrasion resistance needed for these applications. Furthermore, although additives exist which may improve the processability and other properties of the polymer composition, these same additives can change the coefficient of friction (COF) and create undesirable effects in particular applications such as in shoe soles, where surface traction is important.

A polyolefin composition is needed which has improved abrasion resistance. Another desirable feature of such a polyolefin composition is that it possess a desirable coefficient of friction. Yet another desirable feature of such a polyolefin composition is that it be easily processed, thus requiring less energy to process. These and other advantages are taught by the polyolefin composition of the present invention.

BRIEF SUMMARY OF THE INVENTION

On one aspect, the invention is a polymer composition comprising:

(A) at least ethylene interpolymer and (B) at least one polydimethylsiloxane (PDMS) having a viscosity at 25° C. of greater than 100,000 centistokes, said PDMS comprising 0.1 to 10 weight percent of the polymer composition. Preferably, (A) comprises at least one ethylene interpolymer selected from the group consisting of homogeneously branched linear ethylene/α-olefin interpolymer, homogeneously branched substantially linear ethylene/α-olefin interpolymer and ethylene/alpha-olefin/diene terpolymers. The compositions of the invention can have a NBS abrasion resistance tested in accordance with ASTM D 1630-83 of at least 20 percent greater that of component (A) alone and wherein a plaque made from said composition has a coefficient of friction (COF) tested in accordance with ASTM D 1894 not less than 90 percent of the COF of component (A) alone.

In another aspect, the invention comprises an article made from the polyolefin compositions disclosed herein.

In still another aspect, the invention is a method of improving the abrasion resistance of an ethylene polymer while maintaining at least 90 percent of the coefficient of friction of said ethylene polymer, said method comprising the step of incorporating into said ethylene polymer from 0.1 to 10 weight percent of at least one polydimethylsiloxane having a viscosity at 25° C. greater than 100,000 centistokes.

DETAILED DESCRIPTION OF THE INVENTION

The term "ethylene interpolymer" used herein means either a homogeneously branched linear or substantially linear ethylene polymer or interpolymer of ethylene with at least one alpha-olefin, and it can mean a heterogeneously branched interpolymer of ethylene with at least one alpha-olefin, but the term does not refer to homopolymer polyethylene.

The term "linear ethylene polymers" used herein means that the ethylene polymer does not have long chain branching. That is, the linear ethylene polymer has an absence of long chain branching, as for example the traditional heterogeneous linear low density polyethylene polymers or linear high density polyethylene polymers made using Ziegler polymerization processes (e.g., U.S. Pat No. 4,076,698 (Anderson et at.), the disclosure of which is incorporated herein by reference), sometimes called heterogeneous polymers. The Ziegler polymerization process, by its catalytic nature, makes polymers which are heterogeneous, i.e., the polymer has several different types of branching within the same polymer composition as a result of numerous metal atom catalytic sites. In addition, the heterogeneous polymers produced in the Ziegler process also have broad molecular weight distributions (MWD); as the MWD increases, the $I_{10}/I_2$ ratio concurrently increases.

The term "linear ethylene polymers" does not refer to high pressure branched polyethylene, ethylene/vinyl acetate copolymers, or ethylene/vinyl alcohol copolymers which are known to those skilled in the art to have numerous long chain branches. The term "linear ethylene polymers" can refer to polymers made using uniform branching distribution polymerization processes, sometimes called homogeneous polymers. Such uniformly branched or homogeneous polymers include those made as described in U.S. Pat No. 3,645,992 (Elston), the disclosure of which is incorporated herein by reference, and those made using so-called single site catalysts in a batch reactor having relatively high olefin concentrations (as described in U.S. Pat. No. 5,026,798 (Canich) or in U.S. Pat. No. 5,055,438 (Canich), the disclosures of which are incorporated herein by reference) or those made using constrained geometry catalysts in a batch reactor also having relatively high olefin concentrations (as described in U.S. Pat. No. 5,064,802 (Stevens et al.), the disclosure of which is incorporated herein by reference, or in EPA 0 416 815 A2 (Stevens et al.)). The uniformly branched/homogeneous polymers are those polymers in which the comonomer is randomly distributed within a given interpolymer molecule and wherein substantially all of the interpolymer molecules have the same ethylene/comonomer ratio within that interpolymer, but these polymers too have an absence of long chain branching, as, for example, Exxon Chemical has taught in their February 1992 Tappi Journal paper.

The term "substantially linear" means that the polymer has long chain branching and that the polymer backbone is substituted with 0.01 long chain branches/1000 carbons to 3 long chain branches/1000 carbons, more preferably from 0.01 long chain branches/1000 carbons to 1 long chain branches/1000 carbons, and especially from 0.05 long chain branches/1000 carbons to 1 long chain branches/1000 carbons. Similar to the traditional linear homogeneous polymers, the substantially linear ethylene/α-olefin copolymers used in this invention also have a homogeneous branching distribution and only a single melting point, as opposed to traditional Ziegler polymerized heterogeneous linear ethylene/α-olefin copolymers which have two or more melting points (determined using differential scanning calorimetry (DSC)). The substantially linear ethylene polymers are described in U.S. Pat. No. 5,272,236 and U.S. Pat. No. 5,278,272, the disclosures of which are incorporated herein by reference.

Long chain branching for the substantially linear ethylene polymers is defined herein as a chain length of at least 6 carbons, above which the length cannot be distinguished using $^{13}$C. nuclear magnetic resonance spectroscopy. The long chain branch of the substantially linear ethylene polymers is, of course, at least one carbon longer than two carbons less than the total length of the comonomer copolymerized with ethylene. For example, in an ethylene/1-octene substantially linear polymer, the long chain branch will be at least seven carbons in length. However, the long chain branch can be as long as about the same length as the length of the polymer back-bone. For substantially linear ethylene/alpha-olefin copolymers, the long chain branch is also itself homogeneously branched, as is the backbone to which the branch is attached.

For ethylene homopolymers and certain ethylene/alpha-olefin copolymers, long chain branching is determined by using $^{13}$C nuclear magnetic resonance spectroscopy and is quantified using the method of Randall (*Rev. Macromol. Chem. Phys.*, C29 (2&3), pp. 285–297) the disclosure of which is incorporated herein by reference.

The SCBDI (Short Chain Branch Distribution Index) or CDBI (Composition Distribution Breadth Index) is defined as the weight percent of the polymer molecules having a comonomer content within 50 percent of the median total molar comonomer content. The CDBI of a polymer is readily calculated from data obtained from techniques known in the art, such as, for example, temperature rising elution fractionation (abbreviated herein as "TREF") as described, for example, in Wild et al, *Journal of Polymer Science, Poly. Phys. Ed.*, Vol. 20, p. 441 (1982), or as described in U.S. Pat. No. 4,798,081 or as is described in U.S. Pat. No. 5,008,204 (Stehling), the disclosure of which is incorporated herein by reference. The CDBI for the homogeneously branched linear or homogeneously branched substantially linear olefin polymers of the present invention is greater than about 30 percent, preferably greater than about 50 percent, and especially greater than about 90 percent.

A unique characteristic of the substantially linear olefin polymers used in the present invention is a highly unexpected flow property where the $I_{10}/I_2$ value is essentially independent of polydispersity index (i.e. $M_w/M_n$). This is contrasted with conventional Ziegler polymerized heterogeneous polyethylene resins and with conventional single site catalyst polymerized homogeneous linear polyethylene resins having rheological properties such that as the polydispersity index increases (or the MWD), the $I_{10}/I_2$ value also increases.

The density of the ethylene interpolymer, including the substantially linear homogeneously branched ethylene or linear homogeneously branched ethylene/α-olefin polymers, used in the present invention is measured in accordance with ASTM D-792 and is generally from 0.85 g/cm$^3$ to 0.945 g/cm$^3$, preferably from 0.85 g/cm$^3$ to 0.93 g/cm$^3$, and especially from 0.87 g/cm$^3$ to 0.9 g/cm$^3$.

Melting point (and Vicat softening point) of the homogeneously branched linear or homogeneously branched substantially linear olefin polymers used in the present invention correlates primarily with the density of the polymer since the substantially linear ethylene polymers lack a high density (i.e., linear) fraction, with some effects attributable to the molecular weight of the polymer (indicated melt index). Melting point variation of the homogeneously branched linear or homogeneously branched substantially linear olefin polymers used in the present invention is contrasted with heterogeneous ethylene polymers having two or more melting points (due to their broad branching distribution), one of which is about 126° C. and is attributable the high density linear polyethylene fraction. The lower the density of the homogeneously branched linear or homogeneously branched substantially linear olefin polymers used in the present invention, the lower the melting and Vicat Softening point and the higher the coefficient of friction (COF). Thus, lower density ethylene polymers (e.g., density <0.9 g/cm$^3$) especially benefit from the present invention, since their COF is quite high (e.g., as high as 1 or greater using ASTM D 1894) to begin with and addition of other additives makes the polymer more tacky and difficult to handle, making the formulation disadvantageous in specific applications such as shoe sole and tarps. For example, Table A lists Vicat softening point (as measured using ASTM D-1525) versus density for various substantially linear ethylene/1-octene copolymers:

TABLE A

| Density (gm/cm$^3$) | Vicat Softening Point (°C.) |
|---|---|
| 0.939 | 125 |
| 0.922 | 100 |
| 0.903 | 84 |
| 0.886 | 63 |
| 0.884 | 58 |
| 0.872 | 44 |

The molecular weight of the ethylene polymer, including the homogeneously branched linear or homogeneously branched substantially linear olefin polymers, used in the present invention is conveniently indicated using a melt index measurement according to ASTM D-1238, Condition 190 C/2.16 kg (formally known as "Condition (E)" and also known as $I_2$) Melt index is inversely proportional to the molecular weight of the polymer. Thus, the higher the molecular weight, the lower the melt index, although the relationship is not linear. The melt index for the ethylene interpolymer, including the homogeneously branched linear or homogeneously branched substantially linear olefin polymers, used herein, is generally from 0.01 grams/10 minutes (g/10 min) to 100 g/10 min, preferably from 0.1 g/10 min to 30 g/10 min, and especially from 0.1 g/10 min to 5 g/10 min.

Another measurement useful in characterizing the molecular weight of the ethylene polymer, including the homogeneously branched linear or homogeneously branched substantially linear olefin polymers, is conveniently indicated using a melt index measurement according to ASTM D-1238, Condition 190° C./10 kg (formerly known as "Condition (N)" and also known as $I_{10}$). The ratio of these two melt index terms is the melt flow ratio and is designated as $I_{10}/I_2$. For the substantially linear ethylene/αolefin polymers used in the invention, the $I_{10}/I_2$ ratio indicates the degree of long chain branching, i.e., the higher the $I_{10}/I_2$ ratio, the more long chain branching in the polymer. Generally, the $I_{10}/I_2$ ratio of the substantially linear ethylene/α-olefin polymers is at least 5.63, preferably at least 7, especially at least 8 or above. The upper limit of the $I_{10}/I_2$ ratio can be 50, preferably 20, and especially 15. For the substantially linear ethylene polymers, the melt flow ratio ($I_{10}/I_2$) can be increased to compensate for the use of higher molecular weight polymers (i.e., lower melt index polymers). Thus, an elastic substantially linear ethylene polymer having a melt index of about 10 grams/10 minutes, a density of about 0.92 g/cm³, $M_w/M_n$ of about 2, and $I_{10}/I_2$ of about 10 will have a viscosity similar to a substantially linear ethylene polymer having a melt index of about 30 grams/10 minutes, a density of about 0.92 g/cm³, $M_w/M_n$ of about 2, and $I_{10}/I_2$ of about 7.5, when using approximately the same shear rate.

Additives such as antioxidants (e.g., hindered phenolics (e.g., Irganox* 1010 made by Ciba Geigy Corp.), phosphites (e.g., Irgafos* 168 made by Ciba Geigy Corp.)), cling additives (e.g., polyisobutylene (PIB)), slip additives (e.g., erucamide), lubricants (e.g., stearic acid), print- or adhesion-enhancing additives which increase the surface tension of the surface comprising the compositions, processing aids (e.g., fluoroelastomers), fillers (e.g., calcium carbonate, silica dioxide, or talc), plasticizers, oils, antiblock additives, pigments, and the like can also be included in the compositions of the inventions, to the extent that they do not interfere with the enhanced properties discovered by Applicants.

Molecular Weight Distribution Determination

The whole interpolymer product samples and the individual interpolymer components are analyzed by gel permeation chromatography (GPC) on a Waters 150° C. high temperature chromatographic unit equipped with three mixed porosity columns (Polymer Laboratories $10^3$, $10^4$, $10^5$, and $10^6$), operating at a system temperature of 140° C. The solvent is 1,2,4-trichlorobenzene, from which 0.3 percent by weight solutions of the samples are prepared for injection. The flow rate is 1.0 milliliters/minute and the injection size is 100 microliters.

The molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in *Journal of Polymer Science, Polymer Letters*, Vol. 6, (621) 1968) to derive the following equation:

$$M_{polyethylene} = a*(M_{polystyrene})^b.$$

In this equation, a=0.4316 and b=1.0. Weight average molecular weight, $M_W$, and number average molecular weight, $M_n$, is calculated in the usual manner according to the following formula:

$$M_j = (\Sigma W_i(M_i)^j)^j;$$

where $w_i$ is the weight fraction of the molecules with molecular weight $M_i$ eluting from the GPC column in fraction i and j=1 when calculating $M_W$ and j=-1 when calculating $M_n$.

The molecular weight distribution ($M_W/M_n$) for the substantially linear ethylene interpolymers or the homogeneous linear ethylene interpolymers used in the invention is generally less than 5, preferably from 1.5 to 2.8, and especially from 1.8 to 2.8.

The ethylene interpolymers useful in the present invention, including the substantially linear olefin polymers, can be interpolymers of ethylene with at least one $C_3$-$C_{20}$ α-olefin and/or $C_4$-$C_{18}$ diolefins. The ethylene interpolymers used in the present invention can also be interpolymers of ethylene with at least one of the above $C_3$-$C_{20}$ α-olefins, diolefins in combination with other unsaturated monomers. The term "interpolymer" means that the polymer has at least two comonomers (e.g., a copolymer) and also includes more than two comonomers (e.g., terpolymers such as ethylene/alpha-olefin/diene (EPDM)). For EPDM, preferably the diene is 5-ethylidene-2-norbornene or piperylene. However, ethylene/alpha-olefin copolymers are preferred however, and ethylene/$C_3$-$C_{20}$ α-olefin copolymers are especially preferred.

The compositions of the present invention may also contain polyethylene blends produced by the direct polymerization of various combinations of substantially linear or linear olefin polymers in multiple reactors using either single or multiple catalysts.

The ethylene interpolymers are present in the composition of the present invention in the range of about 30 percent to about 99.9 percent by total weight of the composition.

The ethylene interpolymers used in the present invention are mixed with high molecular weight (i.e. they have a viscosity at 25° C. greater than 100,000 centistokes) polydimethylsiloxane (PDMS), such as MB25 or MB 50 (Viscosito>15×10⁶ CST), which is a 25% and 50% concentrate in highly branched low density polyethylene available from Dow Corning or POLYBATCH* IL 2580-SC, available from Shulman, or RHODORSIL* 47 V Silicones, available from Rhone-Poulenc. This does not include the lower molecular weight fluids or lower molecular weight siloxane polymers, such as Dow Corning (R) 200 Fluid silicone Plastic Additive (having a viscosity of about 12,500 centistokes). The PDMS preferably has a viscosity at 25° C. from 1×10⁶ to 2.5×10⁶ centistokes. PDMS can be found in the composition of the present invention in the range of 0.1% to 10% by total weight of the composition. Preferably, PDMS can be found in the composition of the present invention in the range of 0.5% to 5% by total weight of the composition. More preferably, PDMS can be found in the composition of the present invention in the range of 0.5% to 3% by total weight of the composition. In the examples of the present invention using Dow Corning PDMS, a 50% by weight masterbatch PDMS in LDPE is added to the final polyolefin composition.

Other polymers can also be combined with effective amounts of the ethylene interpolymers to make the polyolefin composition of the present invention as well, depending upon the end use properties required. These other polymers are thermoplastic polymers (i.e., melt processable) and include polymers such as polypropylene, ethylene/alpha-olefin/diene terpolymers, styrene block co- and terpolymers, highly branched low density polyethylene, heterogeneously branched linear low density polyethylene, maleic anhydride or succinic acid grafted ethylene homopolymers interpolymers such as those described and/or claimed in U.S. Pat. No. 4,684,576, the disclosure of which is incorporated herein by reference, ethylene/vinyl acetate copolymers, and ionomers such as SURLYN* made by E.I. duPont de Neemours, Inc., and ethylene/acrylic acid copolymers (e.g., PRIMACO™ Adhesive Polymers made by The Dow Chemical Company). The grafted ethylene homopolymers and interpolymers preferably comprise less than 20 percent of the polymer composition.

The polyolefin compositions of the present invention may be used for making fabricated articles requiring good wear resistant properties, such as tarpolins (tarps), various automotive applications (e.g., cargo covers), coated polyester yarns for outdoor furniture applications, coated fabrics, table-cloths, geotextile type transportation products, secondary containment fabrics or tarps, tents, shoe soles, and cable jacketing. The fabricated articles can incorporate the novel compositions claimed herein can use techniques such as using an extrusion coating operation or cast film or laminating process such that the PDMS component may only be added where it's needed, i.e., on the outer surface of the laminate.

EXAMPLES

Example A

30% (by weight) of a substantially linear ethylene/1-octene copolymer having a melt index of 0.5 g/10 min and a density=0.868 g/cm$^3$, 30% (by weight) of a substantially linear ethylene/1-octene copolymer having a melt index of 5 g-10 min and a density=0.87 g/cm$^3$, 28% (by weight) of a substantially linear ethylene/1-octene copolymer having a melt index=1.0 g/10 min and a density=0.885 g/cm$^3$, 10% (by weight) of an ethylene/propylene copolymer having a melt index of 65 g/10 min and a density=0.953 g/cm$^3$ which was grafted with 1.2% of maleic anhydride, 2% PDMS master batch (contains 1% active PDMS). This composition is used to extrusion coat polyester scrim for tarpolin applications.

OTHER EXAMPLES

In other examples, cast co-extrusion film are made from a substantially linear ethylene/1-octene copolymer with and without 10% PDMS in a polypropylene carrier resin. The resins used are ENGAGE* 8100 (a substantially linear ethylene/1-octene copolymer having a melt index of 1 g/10 min and a density of 0.87 g/cm$^3$), and ENGAGE 8150 (a substantially linear ethylene/1-octene copolymer having a melt index of 0.5 g/10 min and a density of 0.868 g/cm$^3$). Laminate structures (Film/PET scrim/Film) are prepared by using the hot press at a temperature and pressure sufficient to integrate the film with the scrim. The samples are then tested by a rope abrasion tester (two ¾ inch of 3-strand twisted polypropylene rope (tensile strength of 7650 lbs.) mounted onto a slide with 20 lbs of weight at 1 hz for 20 seconds) and ranked by appearance. The sample is placed under the rope and abraded for 20 cycles (about 20 seconds) where a rating of "1" means that the sample is completely abraded where the scrim is completely exposed; "5" means that the sample has a first sign of scrim exposure; and "10" means that the sample has little or no visible damage. Table 1 shows that the samples containing the PDMS suffered less surface damage than the controls.

TABLE 1

A/B Coex Films (with PDMS) Laminated to Polyester Scrim (B/A/Scrim/A/B)

A layer = ENGAGE 8100

| B layer | Weight Percent Active PDMS** | Rope Abrasion Test Appearance Rating |
|---|---|---|
| ENGAGE* 8100 (0.87 g/cm$^3$ density) (95%) | 0.5 | 0–1 |
| ENGAGE 8100 + ENGAGE 1880 (0.902 g/cm$^3$ density) (57% + 38%) | 0.5 | 1–2 |

TABLE 1-continued

A/B Coex Films (with PDMS) Laminated to Polyester Scrim (B/A/Scrim/A/B)

A layer = ENGAGE 8100

| B layer | Weight Percent Active PDMS** | Rope Abrasion Test Appearance Rating |
|---|---|---|
| DOWLEX* 2265A (0.924 g/cm$^3$) (95%) | 0.5 | 7 |
| DOWLEX 2265A (85%) | 1.5 | 9–10 |
| ENGAGE 8100 + ENGAGE 1880 (50% + 35%) | 1.5 | 2–3 |

**Percentages do not add up to 100% because the balance of each formulation is the inactive carrier (polypropylene in each case here).

Similar laminate structures (¾ to 3% PDMS MB) were prepared on a Black-Clawson pilot extrusion coating line operating at 550–575° F. The PDMS was obtained from Dow Corning in a 50% masterbatch with LDPE as the carrier. These structures were also tested and compared to a control structure produced using the Shulman PDMS masterbatch using the rope abrasion tester and again significantly less abrasion occurred in the samples containing the PDMS. It was noted in these trials that the extrusion amps were about 30% lower when the PDMS was present at the 2 and 3% loading. Data regarding these trials is presented in Table 2 below.

TABLE 2

Rope Abrasion Testing Monolayer Films

| Film Structure | Weight Percent Active PDMS | Double Rub Rating |
|---|---|---|
| ENGAGE 8100 (0.870) +ENGAGE 8003 (0.885) +PDMS# (55 + 35 + 15%) | 1.5 | 8.0 |
| ENGAGE 8100 (0.870) +ENGAGE 8003 (0.885) +PDMS* (557 + 40 + 3%) | 0.3 | 8.5 |
| ENGAGE 8100 (0.870) +ENGAGE 8003 (0.885) +PDMS* (58.5 + 40 + 1.5%) | 0.15 | 7+ |
| ENGAGE 8100 (0.870) +ENGAGE 8003 (0.885) +PDMS* (59.25 + 40 + 0.75%) | 0.075 | 7 |

Schulman masterbatch with 10% PDMS
*Dow Corning masterbatch with 50% PDMS
NB: Film Extrusion Coated to Polyester Scrim (Film/Scrim/Film)

Polymer samples were prepared containing Shellflex oil and calcium carbonate to determine if PDMS would still produce the desired effect. Table 3 shows that the addition of the oil and filler reduced the abrasion somewhat.

TABLE 3

| Structure | Weight Percent Active PDMS | Rope Abrasion Resistance Rating |
|---|---|---|
| PVC Control* | 0 | 9 |
| ENGAGE 8003 + Oil + CaCO₃ + MB50 (54 + 15 + 29 + 2 wt %) | 1 | 7–8 |
| ENGAGE 8150 + ENGAGE 1880 + Oil + CaCO₃ + MB50 (27.5 + 25.5 + 15 + 2 wt %) | 1 | 7 |
| ENGAGE 8003 + Oil + CaCO₃ (55 + 15 + 30 wt %) | 0 | 6 |

* This commercial tarp was obtained from Hendee Corp, Houston, Texas.

The PDMS is evaluated in shoe sole formulations comprising substantially linear ethylene polymers to try to reduce abrasion. These formulations also contain oil to increase flexibility. Again the formulations with the PDMS showed significantly lower abrasion via NBS tester. COF was not effected by the addition of PDMS to our surprise.

TABLE 4

Coefficient of Friction (ASTM D 1894)

| Resin | | | | | |
|---|---|---|---|---|---|
| ENGAGE 8200 | 50 | 49.75 | 49.5 | 49.88 | 49.5 |
| AFFINITY SM 1300 | 20 | 19.9 | 19.8 | 19.95 | 19.8 |
| oil | 30 | 29.85 | 29.7 | 29.93 | 29.7 |
| stearic acid | 0 | 0 | 0 | 0.25 | 1 |
| PDMS | 0 | 0.5 | 1 | 0 | 0 |
| Shore A | 65 | 67.2 | 68.2 | 66.2 | 65.4 |
| NBS Abr. | 54(4) | 86 | 117 | 62 | 74 |
| COF (dry/wet) | | | | | |
| varnished wood | 1.64/0.89 | 1.53/0.76 | 1.47/0.74 | NM | 1.36/0.68 |
| vinyl tile | 1.82/1.61 | 1.43/1.3 | 1.63/1.4 | NM | 1.6/1.24 |
| mason tile | 0.52/0.34 | 0.51/0.35 | 0.53/0.38 | NM | 0.53/0.35 |

NM = Not Measured

It has been found that when high molecular weight (>1×10⁶ centistokes viscosity) polydimethylsiloxane (PDMS) like one supplied by Dow Corning is incorporated into the polymer or formulation at 0.5 to 3% by weight improved abrasion resistance is achieved sometimes without effecting the coefficient of friction (COF). This has allowed the soft flexible polymer compositions to meet the requirements for applications like tarps where rope abrasion is a problem, shoe soles and wire applications where abrasion can occur when it is being installed in conduit. This result is also totally unexpected, as one would not expect to be able to improve the abrasion resistance without changing the coefficient of friction or slip properties of the material. See, White et al., New Silicone Modifiers for Improved Physical Properties and Processing of Thermoplastics and Thermoset Resins, ANTEC '91, pp. 1904–7 (1991) and Abouelwafa et al., The Wear and Mechanical Properties of Silicone Impregnated Polyethylene.

Another advantage that is often achieved by using the PDMS is lower processing amps. In some case as much as 30% reduction in amps has been achieved which is quite significant for the narrow molecular weight homogenous alpha olefin copolymers. See Table 4 above.

We claim:
1. A polymer composition comprising:
    (A) ethylene interpolymer having a density of about 0.88 ±0.01 g/cm³ or less comprising at least one homogeneously branched linear or substantially linear ethylene interpolymer and
    (B) at least one polydimethylsiloxane (PDMS) having a viscosity at 25° C. of greater than 100,000 centistokes, said PDMS comprising 0.1 to 10 weight percent of the polymer composition,
    wherein said composition has a NBS abrasion resistance tested in accordance with ASTM D1630-83 of at least 20 percent greater than that of component (A) alone and a plaque made from said composition has a coefficient of friction (COF) tested in accordance with ASTM D 1894 not less than 90 percent of the COF of component (A) alone.

2. The polymer composition of claim 1 wherein (A) comprises at least one homogeneously branched substantially linear ethylene/α-olefin interpolymer.

3. The polyolefin composition according to claim 1 wherein the ethylene interpolymer has a melt index in the range from 0.1 g/10 minutes to 30 g/10 minutes.

4. The polyolefin composition according to claim 1 wherein the PDMS has a viscosity at 25° C. from 1×10⁶ to 2.5×10⁶ centistokes.

5. The polyolefin composition according to claim 1 further comprising an ethylene homopolymer or interpolymer grafted with maleic anhydride or succinic anhydride groups.

6. The polyolefin composition according to claim 5 wherein said grafted ethylene homopolymer or interpolymer comprises less than 20 percent of said composition.

7. The polyolefin composition according to claim 1 further containing at least one additive.

8. The polyolefin composition according to claim 7 wherein the additive is calcium carbonate.

9. The polyolefin composition according to claim 1 further containing at least one plasticizer.

10. The polyolefin composition according to claim 1 further containing at least one oil.

11. The polymer composition according to claim 1 wherein the ethylene interpolymer has a melt index in the range from 0.1 g/10 minutes to 30 g/10 minutes and is present in an amount in the range from about 30 percent to about 99.9 percent by total weight of the composition, and the PDMS has a viscosity at 25° C. of at least 1×10⁶ centistokes.

12. The polymer composition according to claim 11, in which the PDMS has a viscosity at 25° C. of greater than 15×10⁶ centistokes.

13. An article incorporating the polyolefin composition of claim 1.

14. An article incorporating the composition of claim 5.

15. A method for the abrasion resistance of homogeneously branched linear or substantially linear ethylene polymer having a density of about 0.88 ±0.01 g/cm³ or less while maintaining at least 90 percent of the coefficient of friction of said ethylene polymer, said method comprising the step of incorporating into said ethylene polymer from 0.1 to 10 weight percent of at least one polydimethylsiloxane (PDMS) having a viscosity at 25° C. greater than 100,000 centistokes wherein the NBS abrasion resistance tested in accordance with ASTM D 1630-83 is improved by at least 20 percent over said ethylene polymer.

16. The method according to claim 15 therein the PDMS has a viscosity at 25° C. from 1×10⁶ to 2.5×10⁶ centistokes.

17. The method according to claim 15 wherein the ethylene interpolymer has a melt index in the range from 0.1 g/10 minutes to 30 g/10 minutes and is present in an amount in the range from about 30 percent to about 99.9 percent by total weight of the composition, and the PDMS has a viscosity at 25° C. of at least $1 \times 10^6$ centistokes.

18. The method according to claim 17 in which the PDMS has a viscosity at 25° C. of greater than $15 \times 10^6$ centistokes.

19. A shoe sole incorporating a polymer composition comprising;
 (A) at least one homogeneously branched linear or substantially linear ethylene interpolymer having a density less than 0.9 g/cm$^3$ and
 (B) at least one polydimethylsiloxane (PDMS) having a viscosity at 25° C. of greater than 100,000 centistokes, said PDMS comprising 0.1 to 10 weight percent of the polymer composition,
 wherein said composition has a NBS abrasion resistance tested in accordance with ASTM D1630-83 of at least 20 percent greater that of component (A) alone and a plaque made from said composition has a coefficient of friction (COF) tested in accordance with ASTM D 1894 not less than 90 percent of the COF of component (A) alone.

20. A shoe sole incorporating the polymer composition of claim 1.

21. A coated yarn incorporating a polymer composition comprising:
 (A) at least one homogeneously branched linear or substantially linear ethylene interpolymer having a density less than 0.9 g/cm$^3$ and
 (B) at least one polydimethylsiloxane (PDMS) having a viscosity at 25° C. of greater than 100,000 centistokes, said PDMS comprising 0.1 to 10 weight percent of the polymer composition,
 wherein said composition has a NBS abrasion resistance tested in accordance with ASTM D1630-83 of at least 20 percent greater that of component (A) alone and a plaque made from said composition has a coefficient of friction (COF) tested in accordance with ASTM D 1894 not less than 90 percent of the COF of component (A) alone.

22. A coated fabric incorporating a polymer composition comprising:
 (A) at least one homogeneously branched linear or substantially linear ethylene interpolymer having a density less than 0.9 g/cm$^3$ and
 (B) at least one polydimethylsiloxane (PDMS) having a viscosity at 25° C. of greater than 100,000 centistokes, said PDMS comprising 0.1 to 10 weight percent of the polymer composition,
 wherein said composition has a NBS abrasion resistance tested in accordance with ASTM D1630 83 of at least 20 percent greater that of component (A) alone and a plaque made from said composition has a coefficient of friction (COF) tested in accordance with ASTM D 1894 not less than 90 percent of the COF of component (A) alone.

* * * * *

UNITED STATES PATENT AND TRADEMARK OFFICE
CERTIFICATE OF CORRECTION

PATENT NO. : 5,902,854
DATED : May 11, 1999
INVENTOR(S) : David C. Kelley, et al It is certified that error appears in the above-indentified patent and that said Letters Patent is hereby corrected as shown below:

column 10, line 53:   Replace:  "for" with --of improving--.

Signed and Sealed this

Twelfth Day of October, 1999

Attest:

Attesting Officer

Q. TODD DICKINSON

Acting Commissioner of Patents and Trademarks